US008348758B2

(12) United States Patent
Cram

(10) Patent No.: US 8,348,758 B2
(45) Date of Patent: Jan. 8, 2013

(54) GAMING SYSTEM HAVING SELECTIVE SYNCHRONIZED MULTIPLE VIDEO STREAMS FOR COMPOSITE DISPLAY AT THE GAMING MACHINE

(75) Inventor: Marc Cram, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 1243 days.

(21) Appl. No.: 10/850,852

(22) Filed: May 21, 2004

(65) Prior Publication Data

US 2005/0020358 A1 Jan. 27, 2005

Related U.S. Application Data

(60) Provisional application No. 60/472,905, filed on May 23, 2003.

(51) Int. Cl.
*A63F 13/00* (2006.01)

(52) U.S. Cl. ................. 463/31; 463/16; 463/20; 463/32

(58) Field of Classification Search .................... 463/30, 463/16–21, 31–33, 40–42
See application file for complete search history.

(56) References Cited

U.S. PATENT DOCUMENTS 5,465,982 A 11/1995 Rebane
5,889,499 A * 3/1999 Nally et al. ....................... 345/7
5,971,271 A * 10/1999 Wynn et al. ................... 235/380
6,354,939 B1 * 3/2002 Morita et al. ...................... 463/1
6,652,378 B2 * 11/2003 Cannon et al. .................. 463/20
6,939,226 B1 * 9/2005 Joshi ............................... 463/20
2002/0077170 A1 * 6/2002 Johnson et al. ................. 463/16
2002/0123378 A1 * 9/2002 Bucknall et al. ................ 463/16
2005/0054423 A1 * 3/2005 Wadleigh ........................ 463/20

FOREIGN PATENT DOCUMENTS

EP 0 292 239 11/1988
EP 04 77 6092 10/2006

* cited by examiner

*Primary Examiner* — Ronald Laneau
*Assistant Examiner* — Ross Williams
(74) *Attorney, Agent, or Firm* — McAndrews, Held & Malloy, Ltd.

(57) ABSTRACT

A plurality of electronic gaming machines are interconnected over a network to a central computer. Each gaming machine generates a composite video signal formed from at least two video signals. A first video signal carries game graphics information for generating at least a still graphics display which moves at selected times during play of the game. A second video signal carries video information for generating a moving video display. The two video signals are combined in accordance with key color information, which is carried by the first video signal. The combining is selectively controlled by the central computer. The central computer may also select which one of a number of second video signals may be combined with the first video signal. The central computer may also select a particular key color from a plurality of key colors defined in said key color information so as to control where on the display unit that the combining takes effect.

15 Claims, 6 Drawing Sheets

GAMING SYSTEM HAVING SELECTIVE SYNCHRONIZED MULTIPLE VIDEO STREAMS FOR COMPOSITE DISPLAY AT THE GAMING MACHINE

CROSS-REFERENCE TO RELATED APPLICATION

This application claims the benefit under 35 U.S.C. §119 of U.S. Provisional Application No. 60/472,905 filed May 23, 2003, incorporated by reference herein.

STATEMENT REGARDING FEDERALLY SPONSORED RESEARCH OR DEVELOPMENT

Not applicable.

BACKGROUND OF THE INVENTION

The present invention relates to gaming systems, and more particularly relates to a multimedia presentation at the gaming machine formed by synchronized multiple video streams and/or audio streams.

In order to maintain interest of the player of a gaming machine, the video screen presentation of still and moving elements provides great attraction. Heretofore, this has been accomplished by generation of unique content video presentations on the gaming machine display using a single video stream carrying the display content. In other cases, multiple display units have been positioned both on the gaming machine and at a separated location.

In addition to providing an interesting display at the gaming machine, it is desirable to provide a number of services and benefits to the player while the player is at the gaming machine. Such services may be initiated or provided via the display unit(s) of the gaming machine. For example, a player may desire to make a dinner reservation. To do so, the player would leave the gaming machine and walk to the casino restaurant where the player would make the reservation. This causes delay in the gaming activities of the player and may pose an annoying inconvenience. Instead, the player may visually access the remote reservationist from the gaming machine. For example, U.S. Pat. No. 5,971,271, which issued on Oct. 26, 1999, describes such a communication system. Instead of live content, other gaming machines have provided video entertainment at the gaming machine. See, for example, U.S. Pat. No. 6,113,495, which issued on Sep. 5, 2000.

However, in these types of systems, problems arise where the player views two disjointed and unrelated video displays occurring at the same time, or where one distant display interrupts viewing of a near display. The player must deal with one display or the other or alternatively attempt to deal with both at the same time.

SUMMARY OF THE INVENTION

It is therefore an object of the present invention to provide a gaming system having a single video presentation, formed from multiple and independent video streams, at the individual gaming machine.

It is yet another object of the present invention to provide player amusement and interest at a gaming machine by generating a composite video presentation formed of a plurality of independent videos which are simultaneously and synchronously displayed as a composite on a single game display screen.

It is another object of the present invention to provide for player activation of a composite video display from selected ones of independent video streams to be displayed on the same screen of the gaming machine.

It is yet another object of the present invention to permit the player to select a game presentation by activating an independent video stream synchronized with a primary game video stream.

It is yet another object of the present invention to provide a composite gaming machine display which includes a real time video presentation of live events.

These and other objects of the present invention are achieved in a source of multiple independent video streams which are synchronized and combined into a single composite stream which is displayed on a single display screen or panel of the gaming machine. In some embodiments, player interaction with a gaming machine interface effects the composite video stream. In other embodiments, a remote central computer affects the composite video stream.

DESCRIPTION OF THE PREFERRED EMBODIMENT

Figure 1:
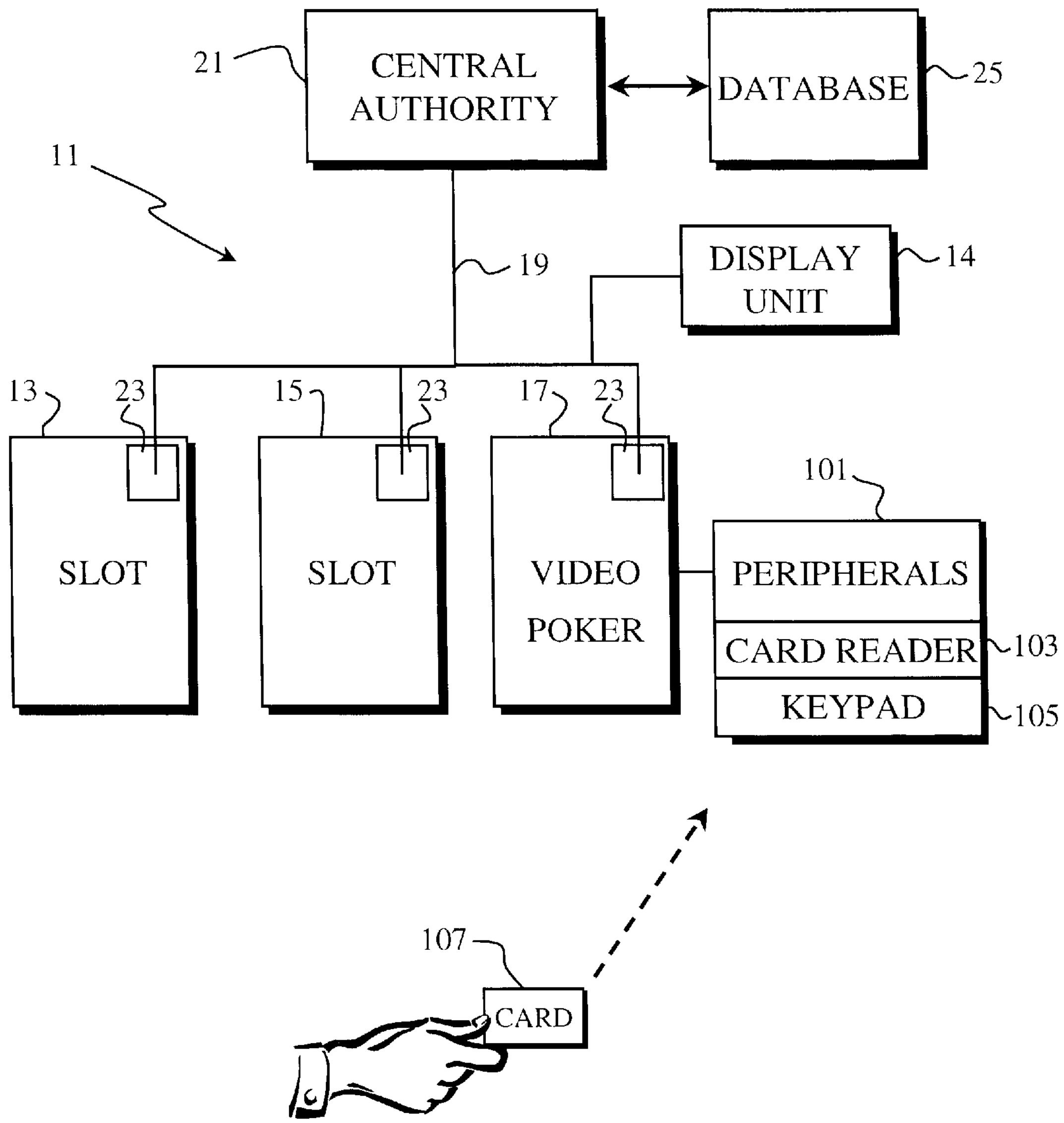
FIG. 1 is a block diagram of a gaming system according to an embodiment of the present invention.

Referring to FIG. 1, a gaming system 11 includes a plurality of gaming machines 13, 15 and 17 interconnected over a network 19 to a central authority 21. Network 19 may include subnetworks using RS485 serial protocol and data port units (not shown). Network 19 also may be configured as an Ethernet network employing TCP/IP protocol, or may comprise a digital subscriber line (DSL) network.

Data is transmitted over network 19 between the gaming machines and central authority 21 which is formed of one or more computers. Each gaming machine includes a smart communication interface 23 for control of communications over network 19. Interface 23 may be a microprocessor based device, as for example, the Sentinel interface manufactured by Aristocrat Technology Inc. of Las Vegas, Nev., the assignee of the present invention. Central authority 21 stores game output data (received from the gaming machines) and stores game input data (to be sent to the gaming machines) in a central database 25.

As will suggest itself, more than the three gaming machines 13, 15 and 17 may be connected to network 19. Gaming machines 13 and 15 are slot electronic gaming machines and gaming machine 17 is a video poker electronic gaming machine. Other types of gaming equipment and gaming machines may be connected to network 19, including table games, which may or may not include a composite display of multiple video streams, as described hereinafter. In addition, a display unit 14 e.g., a large plasma screen unit, is located external to gaming machines 13, 15, 17. Display unit 14 provides displayed information and/or video to players at a bank of a number of gaming machines, e.g., machines 11, 13, 15 and may include a composite display of multiple video streams, as described hereinafter.

Figure 2:
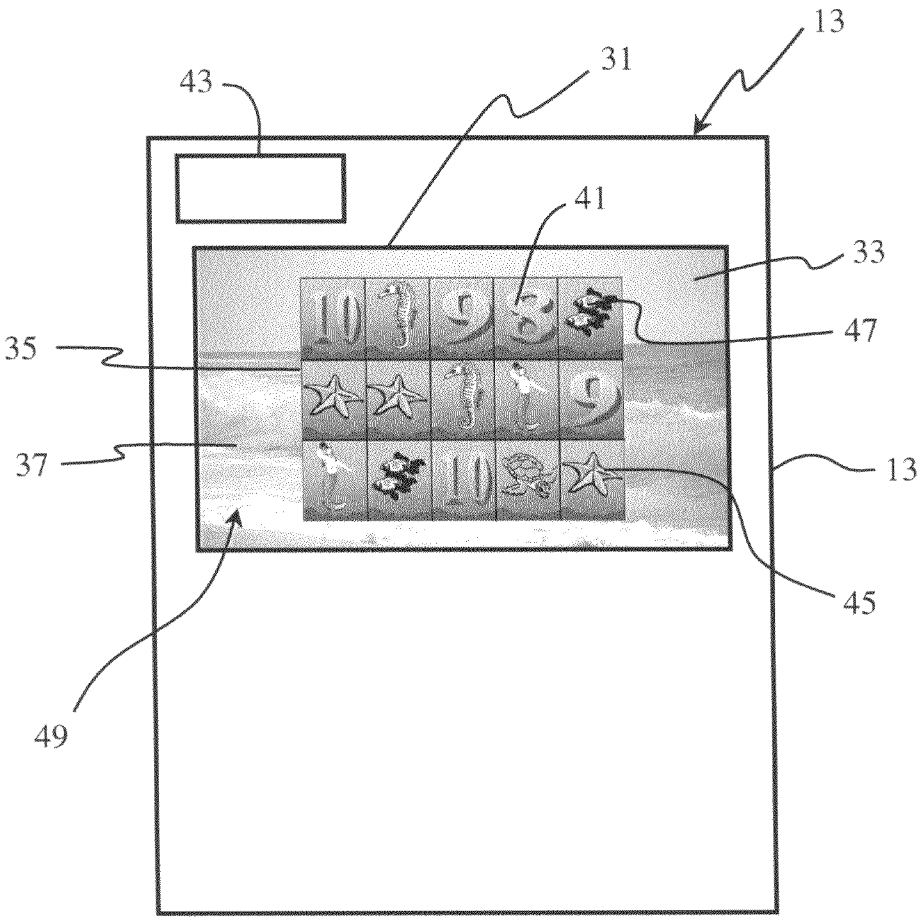
FIG. 2 is a block diagram of the outer face of a gaming machine of the gaming system of FIG. 1, showing a composite display formed from multiple video signals.

As shown in FIG. 2, gaming machine 13 includes a main display unit 31 which is positioned on the outer front face of the machine for direct presentation to the player of a composite video display formed of still display graphics and moving video images. While not part of the described embodiment, other display units (not shown) may be used on gaming machine 13 if desired, including a heads up display, a picture in picture unit, a dual monitor unit, a moving picture box and an adventure background unit. Another one or both of the gaming machines 15 and 17 may include a display unit 31 and may include a composite display of multiple graphics or images, as well.

Display unit 31 is formed from a cathode ray tube (CRT) display. However, other types of display units may be used, such as a liquid crystal display (LCD), a plasma display, etc. Display unit 31 preferably presents a rectangular display face 33 upon which video images or graphics may be displayed.

Display unit 31 generates a primary display area 35 centrally located on display face 33. A secondary display area 37 is located as a border surrounding primary display area 35. Display areas 35, 37 may be of any size, and together fill the entire area of display face 33.

Primary display area 35 is used to display the primary game features for play of a game. For example, the display unit may generate a conventional slot game in which a plurality of symbols 41 (fifteen symbols being shown) are moved within their respective column, as if rotated, at the appropriate time in response to the user activation of the gaming machine.

Secondary display area 37, in a first embodiment, presents a continuously moving video image of an ocean beach scene 49 of incoming waves breaking at a shoreline. An audio sound of ocean waves is generated by audio speaker 43 located on the front surface of the gaming machine. The sound from speaker 43 is generated in synchronism with the breaking of the waves shown in secondary display area 37.

Some or all of the symbols 41 may be display graphics having a beach motif or ocean theme. For example, a symbol 45 has the appearance of a starfish. A symbol 47 has the appearance of two swimming fish. Other symbols may include, for example, a sea horse and a mermaid. For most of the time, symbols 41 are “still” (non-moving) until game play when symbols 41 rotate within their respective column in a conventional slot machine manner.

As understood, other themes may be presented by the video displays in areas 35, 37. For example, an erupting volcano may be shown in secondary display area 37. Corresponding synchronized sound may be produced from speaker 43.

Figure 3:
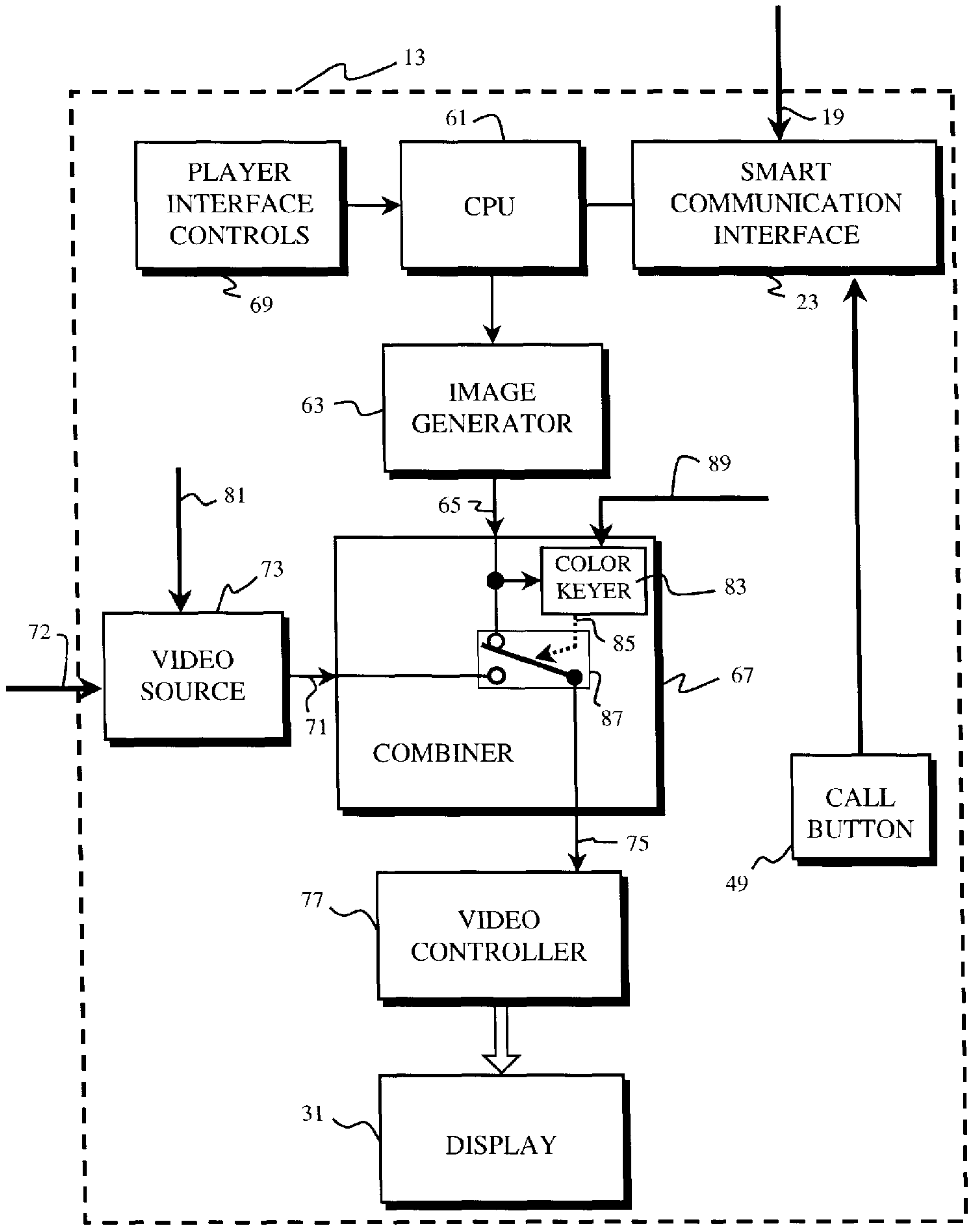
FIG. 3 is a block diagram of the gaming machine of FIG. 2.

Referring to FIG. 3, gaming machine 13 includes a game control CPU 61 which is responsible for carrying out the main functions of the gaming machine. CPU 61 executes each game as the player interacts with the gaming machine, including visually and/or audibly interacting with the player, as well as generating game outcomes. In addition, CPU 61 processes network information by receiving from, and sending data to, smart communication interface 23. CPU 61 includes a microprocessor and associated memory (not shown).

Game control CPU 61 controls an image generator 63 which generates a primary video signal 65. Video signal 65 is used to present game graphics, for example, the five columns of symbols 41 (FIG. 2) in primary display area 35 (FIG. 2). Video signal 65 also presents a plain, colored border in secondary display area 37, as described hereinafter. Video signal 65 is sent to a video combiner 67.

Video signal 65 is generated from prestored data in generator 63 in order to present one or more particular games to the player. The player may select a particular game to be played and image generator 63 generates a video signal 65 corresponding to the game selected. The video signal 65 is developed and changes in accordance with the play of the game. The video signal 65 carries game graphics information that produces still symbols 41 on a green background within the five columns (each column showing three symbols) and that moves the still symbols 41 by columnar rotation at select times. CPU 61 receives control signals from one or more player interface controls 69 in order to carry out game play, e.g., rotating the symbols.

Player interface controls 69 may also be used for game selection. In such a case, CPU 61 communicates with image generator 63 in accordance with the game selected by the player. As understood, gaming machine 13 may provide play of only one game such that game selection by a player is not a feature of gaming machine 13.

Where gaming machine 13 allows for player selection of the particular game played, players may prestore their game preference in central database 25 (FIG. 1). Such preference data may be downloaded to gaming machine 13 after player identification at the gaming machine. Identification codes, player cards, fingerprints and other recognition devices may be used to identify the player.

Referring again to FIG. 1, gaming machines 13, 15, 17 may each contain or interface with a number of peripheral devices 101 including, for example, a card reader 103 and a key pad 105. The player inserts his or her player card 107 into a card reader 103 and enters his or her personal identification number (PIN) into keypad 105. The data retrieved from the card 107 together with the PIN is forwarded by smart communication interface 23 to central authority 21 for identification of the player. The central authority may then download any prestored preference data of the player to smart communication interface 23 which in turn provides corresponding signal data to game CPU 61 (FIG. 3). As understood, the communication between communication interface 23 and central authority 21 may take on different forms and protocols.

Referring again to FIG. 3, a video source 73 generates a second video signal 71 which is independent of video signal 65. The second video signal 71 is used to present a second moving video image, for example, image 49 of an ocean beach scene (FIG. 2) to cover the entire display face 33. Video signal 71 carries video information that produces the moving ocean beach scene display. Video signal 71 is sent to video combiner 67.

The first and second video signals 65, 71 are combined at combiner 67 to form a composite video signal 75. Composite video signal 75 is sent to a video controller 77 which drives display unit 31 for display of a composite image, for example, the image shown in FIG. 2. Additionally, video signal 71 or composite video signal 75 may be transmitted out of the gaming machine 13 to external display unit 14 via cable (not shown).

The combiner 67 replaces portions of video signal 65 with portions of video signal 71. The location of the replacement depends on the presence of, for example, a particular shade of a color or shade of gray—commence on chrominance in the video signal 65. A color keyer circuit 83 receives video signal 65 and outputs a keying signal 85 in accordance with the presence or absence of the particular shade of color in video signal 65. A switching amplifier 87 (diagrammatically represented as a SWITCH) responds to keying signal 85 to switch either video signal 65 or video signal 71 as the output signal 75. The particular color or shade of gray to which color keyer 83 responds may be determined, for example, by a control signal sent along line 89. For example, an eight bit word may represent 256 different color shades. Color keyer 89 may programmably store such an eight bit word to identify the particular color to which color keyer 89 responds. Alternatively, the color keyer need not be programmable and may respond in accordance with fixed data identifying a particular color shade, for example, an eight bit word may be stored in a ROM (not shown) located within color keyer 83.

A control signal along line 89 may also serve to maintain the switching amplifier in a state to pass only video signal 65 as the output signal 75. Such a control signal on line 89 turns ON and turns OFF the combining effect. This may be as simple as a control signal on line 89 providing an eight bit word which identifies a color not found in video signal 65. Alternatively, signal 89 may merely control switching amplifier 87 to a pass only video signal 65, or to pass only video signal 71.

Figure 4:
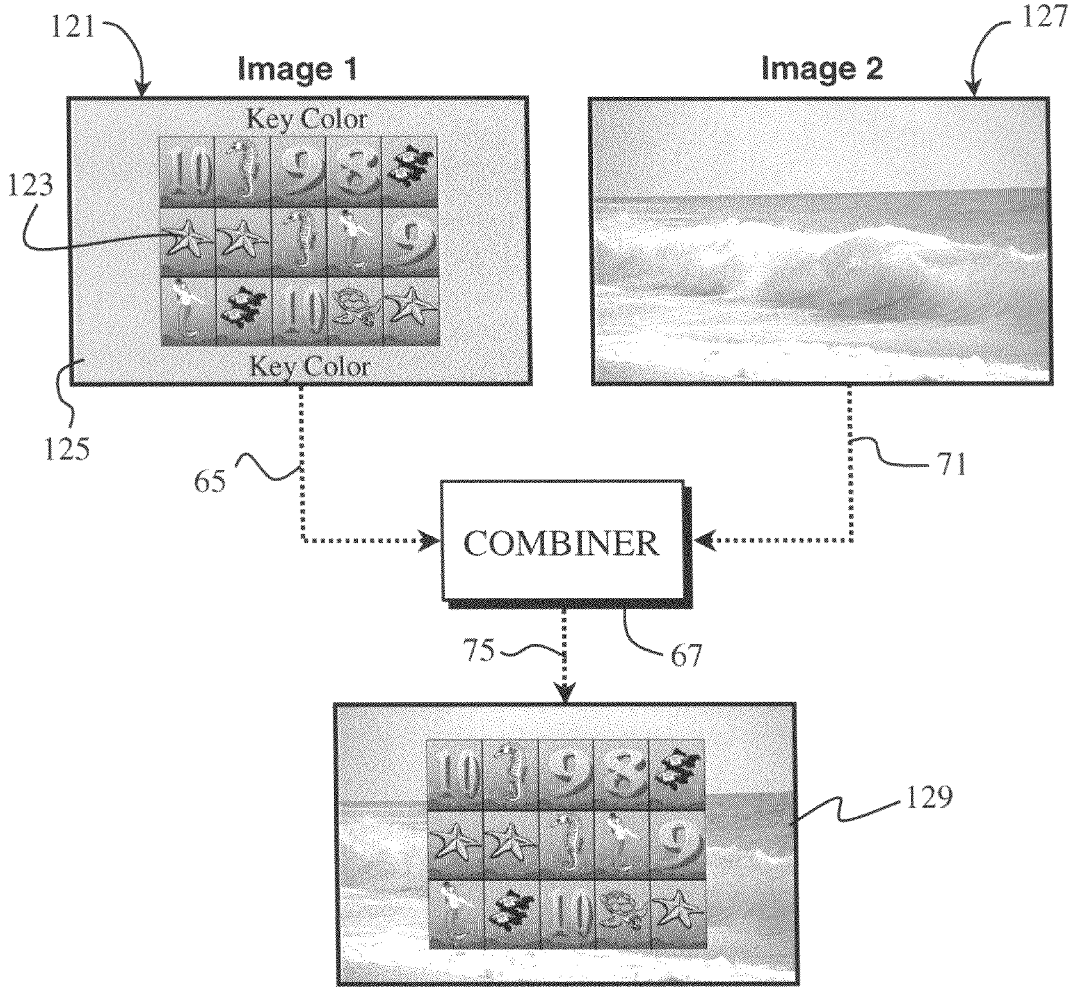
FIG. 4 is a block diagram representation of a combining of two video streams as a composite video display on the display screen of the gaming machine of FIG. 2.

Referring to FIG. 4, the video image created by video signal 65 will generate a foreground image 121 formed of a center game area 123 and a border area 125. Border area 125 is of a particular shade of the color gray, for example. The image in center game area 123 does not contain this shade of the color gray, in this embodiment. The video image created by video signal 71 will generate a moving video background image 127. The two video signals 65, 71 are combined by combiner 67 to generate composite video signal 75. The video image created by composite video signal 75 is a combined image 129. The color keyer 83 thus effectively removes the area where the particular shade of gray is found in the foreground image 121 and effectively allows the background image 127 to show through to the foreground in this area.

The composite video image 129 thus includes a continuously moving video of ocean waves in the border area, and a still (fixed) graphic display of symbols in the center area. The symbols will rotate however, at the proper time, in response to player activation of the game.

Referring again to FIG. 3, image generator 63 may store the foreground image 121 (FIG. 4) as digital video data in a frame store (not shown). The storage of digital data will be in a raster format. The stored digital video data may be expressed as “picture points” written at specified address locations in the frame store. In such an embodiment, the stored image data would be processed under software control in the image generator 63 in order to generate video signal 65. The picture points are read out (addressed) from storage in accordance with a clocking signal to provide the video signal 65. The instructions from CPU 61 would cause image generator 63 to “spin” the symbols displayed on display unit 31 by addressing particular data for creating moving reels in the video signal 65.

CPU 61 first determines the outcome of the game, i.e., the five symbols to occur in the center row at the end of the spin. (Horizontal pay lines may be included to indicate the winning row(s)). CPU 61 thereafter instructs generator 63 to spin the symbols in order to present a display conforming to the game outcome.

As will suggest itself, instead of a digital signal, image generator 63 may generate an analog output signal as signal 65. For example, the digitized video data signal may be converted to an analog output signal in the image generator 63 by the addition of clock synch pulses prior to output to combiner 67. Alternatively, combiner 67 may operate directly on a digital video signal input received as video signal 65. Whether in analog or digital format, video signal 65 carries game graphics information, as well as key color information which identifies the particular screen area in accordance with the key color data’s location in time in video signal 65.

The video information in video signal 65 is analyzed by color keyer 83. Where the video signal 65 is in digital form, color keyer 83 inspects each picture point for the key color. If the picture point is the key color, then color keyer 83 causes amplifier 87 to switch to the video digital picture point of video signal 71. As understood, clocking signals serve to synchronize video signals 65, 71 so that the signals present picture point information for the same point at the same time on the CRT display. While amplifier 87 is shown as a mechanical switch, typically amplifier 87 is constructed from solid state switches.

Combiner 67 may include a digital-to-analog converter which converts the digital video signal output from amplifier 87 to an analog composite video signal 75. Analog video signal 75 will be developed with the necessary synch pulses in order to drive display 31 in a raster scan type presentation. Video controller 77 receives the analog video signal 75 and drives display 31 in a conventional manner. As understood, the digital-to-analog converter may be located instead in video controller 77.

Video source 73 may be a video signal storage device which is addressable along line 81 in order to select one particular video signal from among a plurality of video signals stored in video source 73. Line 81 may be used by central authority 21, and/or communication interface 23 or CPU 61 to select the video signal 71. For example, in order to reward the player with a special display effect, central authority 21 may generate a command on network 19 to select a particular video signal 71.

Video source 73 may include a DVD player, or camera, digital photo, jpeg, bit map, video camera microphone, vector map, biometric or MPEG player, or MPEG2 player, or VHS, DVD or SVGA player, or a frame store, for storing digital video data. In addition, as described below, a video signal may be sent to video source 73 along conductor 72 and then output as video signal 71. The output video signal 71 of video source 73 may be a digital video stream which is sent to combiner 67. Video signal 71 is clocked in synchronism with video signal 65 so that both signals present a timed raster format of their respective images.

Figure 5:
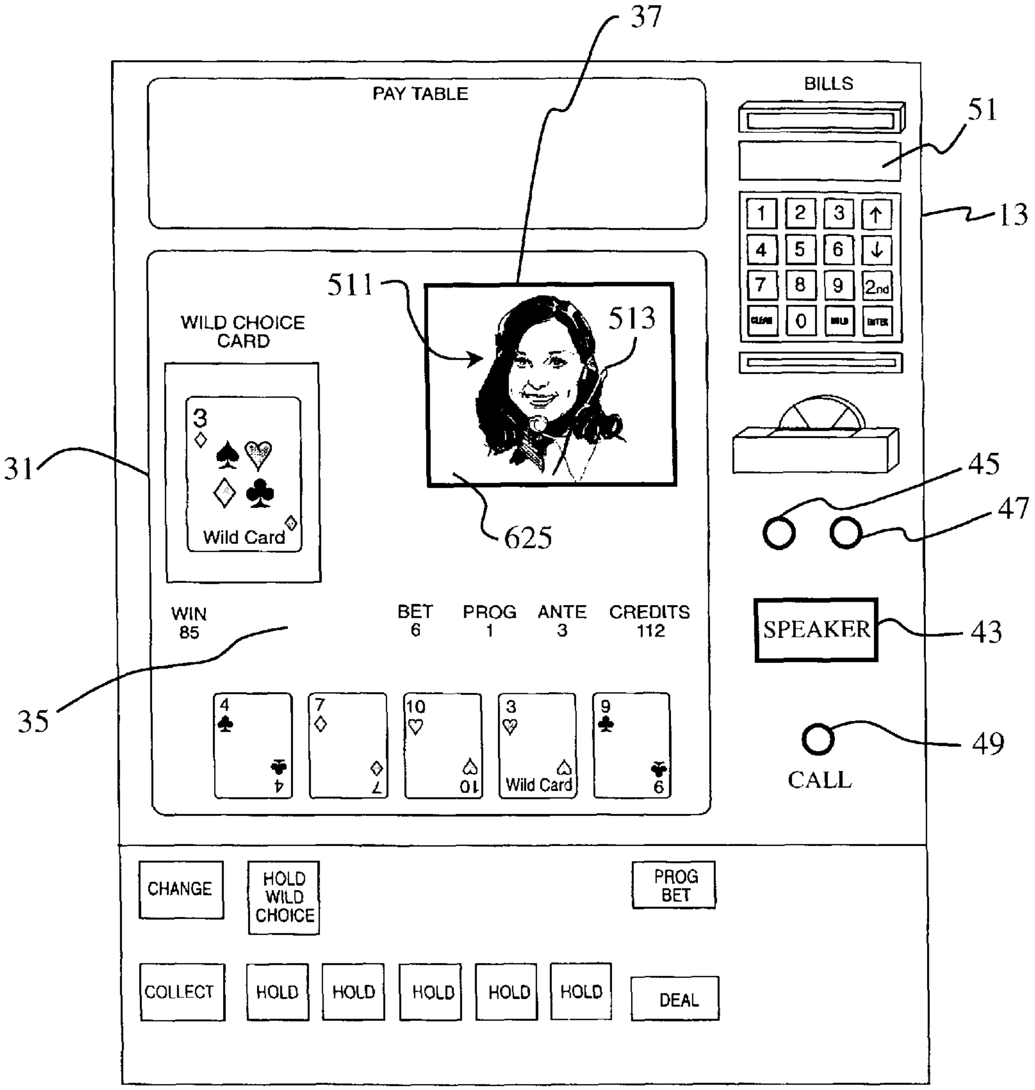
FIG. 5 is a block diagram representation of a video display for presentation on the display screen of the gaming machine of FIG. 2.

Referring to FIG. 5, secondary display area 37, in another embodiment, presents a live, real time, camera image video of at least the face of a person 511. Person 511 communicates with the player of the gaming machine via the display area 37, an audio speaker 43 and a microphone 45. For example, the person 511 may be a reservationist of a restaurant within the gambling casino where gaming machine 13 is located. If desired, a video camera 47 may be positioned on the gaming machine for generating a real time image of the player. An image signal from camera 47 may be transmitted to a separate CRT display unit (not shown) at the reservationist’s station for viewing by the reservationist.

Preferably, the video image in secondary display area 37 appears on display unit 31 solely at a time when the player desires to speak with the person 511. Initially, display unit 31 displays game graphics only in primary display area 35 (cards and game information being shown in FIG. 5 in area 35). The player activates a “call” to the reservationist by player interaction with controls at the gaming machine, as for example, a call button 49. After call button 49 is pressed, a display of person 511 appears in secondary display area 37. Preferably, secondary display area 37 is located at an appropriate position on display unit 31 to facilitate communication between the player and the person pictured in display area 37.

Using microphone 45, the player may speak to person 511, for example, asking the person 511 for a dinner reservation, assuming person 511 is a reservationist. The player sees the reservationist respond back by viewing display area 37 and listening to the speech of person 511 coming from speaker 43.

Figure 6:
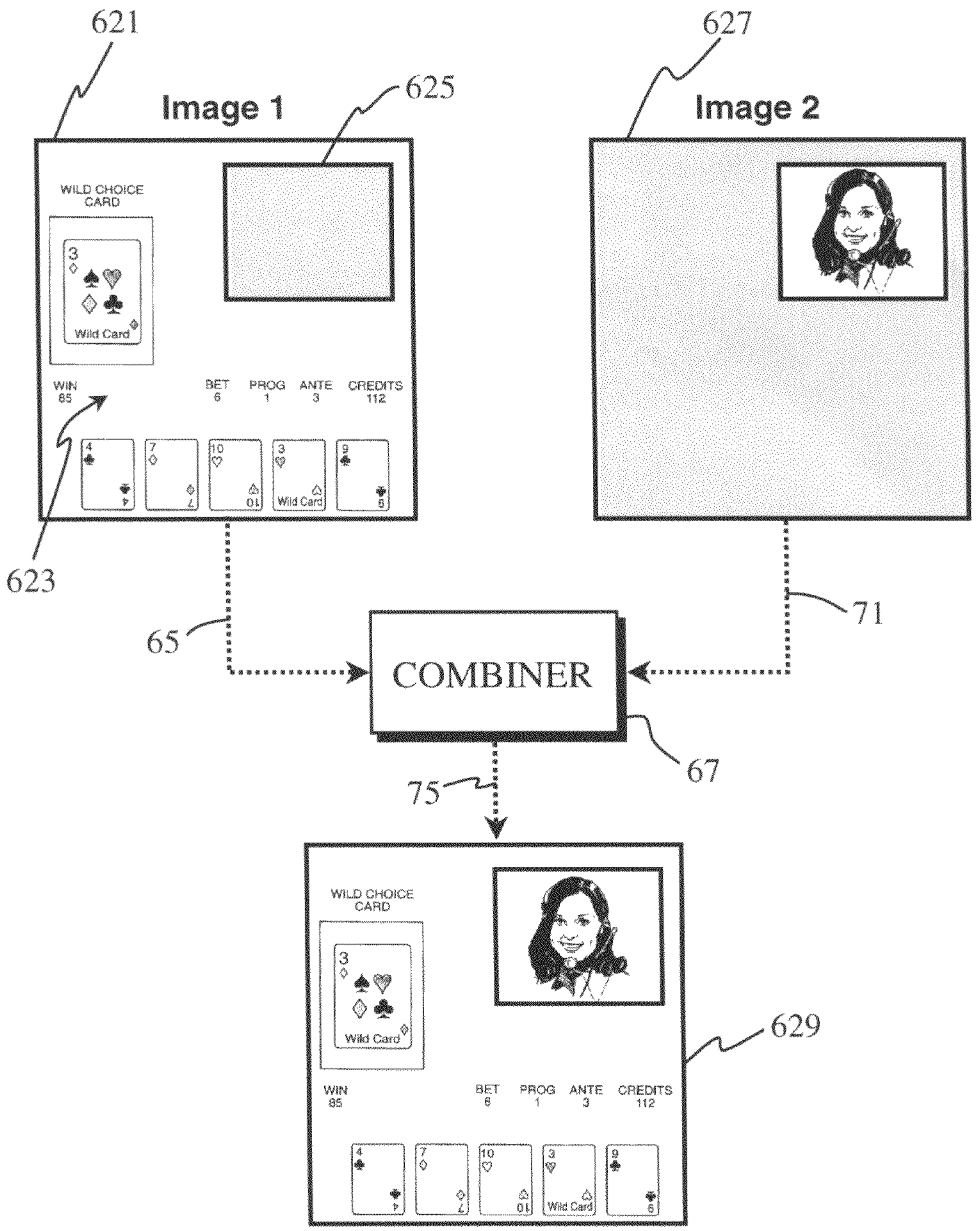
FIG. 6 is a video display of part of the display screen of the gaming machine of FIG. 2.

Referring to FIG. 6, the video image created by video signal 65 will generate a foreground image 621 formed of a game area 623 and a square area 625. Square area 625 is a particular shade of the color gray, for example, and does not overlap into game area 623. Other colors such as green may be used. The remaining image in game area 623 does not contain this shade of the color gray. The video image created by video signal 71 will generate a background image 627. The two video signals 65, 71 are combined by combiner 67 to generate composite video signal 75. The video image created by composite video signal 75 is a combined image 629.

Referring to FIG. 3, video source 73 receives a live, real time video signal along conductor 72 from a camera (not shown) at the reservationist station. The signal on conductor 72 carries information to generate the video image 627 (FIG. 6). Source 73 may digitize the signal on conductor 72 using a frame buffer so as to provide a digital video signal 71 to combiner 67. As understood, the signal along conductor 72 may be another video signal which is not from the camera during times that the reservationist is not called or at times where the reservationist is busy when called.

Upon actuation of call button 49 by the player, the secondary video signal 71 from video source 73 is combined with the primary video signal 65 to form composite signal 75. The secondary video signal 71 will present its video display wherever the particular shade of the color gray, for example, appears in the primary video signal 65. Thus, in this embodiment, the secondary video will only appear in image area 625 (FIG. 6) which is the color gray.

As shown in FIG. 5, the real time image of the restaurant reservationist 511, for example, will appear in square area 625. The player will be able to view person 511 and carry on a conversation with the person 511 the player will hear reservationist 511 from audio speaker 43 and speak to reservationist 511 via microphone 45. Reservationist 511 may wear a suitable telephone head set 513 in order to hear and speak to the player.

The video display 627 (FIG. 6) of person 511 is a background video display which may be color keyed into the foreground video on the display unit. Video source 73 (FIG. 3) may position the video data from the signal on conductor 72 into the upper right corner of background display 627 (FIG. 6). Alternatively, the signal on conductor 72 may already be formatted so as to create the display 627 (FIG. 6).

Referring again to FIG. 3, actuation of call button 49 causes communication interface 23 to communicate a call request over network 19 to central authority 21. Call button 49 may generate an interrupt to the microprocessor of interface 23, or interface 23 may poll call button 49 to determine whether the call button has been activated.

Interface 23 may respond to activation of call button 49 in a number of ways. First, interface 23 may communicate with the player that the call is being initiated. This may occur by interface 23 providing instructions to video source 73 along input 81. Video source 73 may provide a CALL REQUEST background display for insertion in area 625 (FIG. 5). Such a background display may be still graphics of words stating that a connection to the reservationist is being made. Alternatively, interface 23 may generate a display in a second display unit 51 (FIG. 5) which is one of peripherals 101 (FIG. 1). Alternatively, display unit 14 (FIG. 1) may be activated by interface 23.

Secondly, interface 23 provides a request to the central authority to connect the reservationist to a particular gaming machine. Central authority 21 controls the switching of the receptionist video camera signal to conductor 72 of the particular gaming machine. In addition, central authority 21 controls the switching of the receptionist microphone signal (not shown) to speaker 43. Central authority 21 also connects microphone 24 and camera 47 (FIG. 5) to a speaker (not shown) and a CRT display (not shown) at the receptionist location.

Interface 23 may also provide instructions to video source 73 along input 81 so as to connect the video signal of conductor 72 as the video signal 71 to combiner 67.

Reservationist 511 is able to disconnect from the player at will by activation of a disconnect button (not shown) located at the receptionist station, for example. Upon activation of the disconnect button, a data signal is sent to central authority 21. Central authority 21 may remove the video signal from conductor 72 and disconnect the audio signal from speaker 43. In addition, central authority 21 may transmit a disable signal to interface 23 of the particular gaming machine. Interface 23 may disable the video source 73 from providing the signal on conductor 72 as video signal 71, and may disable microphone 45, speaker 43 and camera 47. As will suggest itself, music or game sounds may now be presented from speaker 43. That is, speaker 43 may be used for either music entertainment to the player, sounds associated with the particular game being played at the machine or voice from reservation 511.

Central authority 21 may control the use of speaker 43. For example, upon disconnect by reservation 511, central authority 21 may merely deactivate speaker 43 via interface 23 from the audio signal coming from the reservationist's station and re-enable the game audio signals to speaker 43. Also, for example, an audio game signal carrying sounds associated with the game may be input to speaker 43 instead of a separate speaker (not shown). The audio game signal may be disconnected from the speaker when the player activates the call button 49. Alternatively, the audio game signal may be decreased in volume, or muted automatically by the voice audio signal, after the player activates the call button so that the player may hear reservationists 511 clearly. As will suggest itself, when the game audio signal is sent to a separate game speaker (not shown), the volume from the separate game speaker may be decreased or muted.

Reservationist 511 may also provide an "annoyance disconnect request" to central authority 21 to prevent this particular player, as identified by the player's player card, from further activation of this feature. For example, should the player prove annoying to the reservationist 511, reservationist 511 may activate an annoyance button.

Activation of the annoyance button transmits a signal to central authority 21. The central authority stores annoyance data in the player's account to indicate that communication by the player to the reservationist 511 will be blocked. Thus, the communication system may be activated by the central authority for carded players only. Upon insertion of a player's card, and preferably a player's PIN number associated with the card, central authority 21 inspects the player's account to determine whether the player may have access to the reservationist 511 by way of call button 49.

When the player later attempts activation of call button 49 at any gaming machine, central authority 21 reviews the player's account for an annoyance indicator. If an indicator exists in the player's account, central authority 21 will not connect the reservationist to the gaming machine. Instead, central authority may connect a still video display from video source 73 that states that a connection cannot be made and for the player to contact casino personnel. Alternatively, the central authority may connect the player to a security person, via secondary display 37, who will then explain why the feature has been denied to the player.

Restaurant reservationist 511 may instead be a hotel concierge, a cocktail server, a security person, a slot manager, or a technician. Alternatively, an operator may be linked up initially, who will then connect the player to the appropriate person depending upon whom the player wishes to speak.

Referring to FIG. 3, video source 73 may include a number of sources. For example, a television tuner in video source 73 may generate video programming, and outputs a corresponding digital or analog video signal to combiner 67.

CPU 61 may send instructions to video source 73 for selection of the particular video stream 71 which is sent to combiner 67. For example, different border backgrounds 37 (FIG. 2) may be selected by CPU 61.

Also, central authority 21 may communicate through interface 23 to video source 73 to generate a particular video signal 71 to combiner 67. For example, to award the player a bonus, the central authority may provide an enhanced video display via combiner 67. The central authority receives player tracking and machine data, for example, the amount of wagers made by a player at the gaming machine. Any one or more of these variables may be monitored by the central authority during play of the gaming machine. When the variable monitored reaches a predetermined threshold, a bonus is granted to the player. The central authority generates a command over the network to enhance the video display via operation of combiner 67.

In another form of promotion, central authority 21 may recognize the particular player as a class A player from inspection of the player's player account in database 25, and responsively enhance the video display. Also, central authority 21 may recognize the present day as the player's birthday, for example, and cause video source 73 to generate a Happy Birthday background video signal to combiner 67 for presentation as a border display 37.

Image generator 63 includes memory, such as a hard drive, for holding multiple images that are displayed onto display 31. Different types of video data may be stored such as digital disk (DVD) data, Motion Pictures Expert Group (MPEG) data, etc. Image generator 63 develops video signal 65 in response to control signals from CPU 61.

As understood, video source 73 may generate more than one video signal 71, for example two video signals, simultaneously to combiner 67. Color keyer 83 may switch one video signal 71 to one key color in video signal 65 and switch another video signal 71 to a different key color in video signal 65. Video source 73 may be located outside of gaming machine 13 so as to provide video signal 71 to the gaming machine. In addition, output 75 from combiner 67 may drive external display unit 14 in order to provide a composite video formed of a background image 127 (FIG. 4) and an advertising image to advertise the gaming machines. Thus, background image 127 appearing on external display unit 14 is exactly the same as the background image 127 appearing on display 31 of the gaming machines, thus providing exact moving videos in real time synchrony on both gaming machines and external display unit 14 located adjacent to those gaming machines. A combiner 67 could be located in the external display and receive (1) the video signal 72 which is also being sent to the bank of machines and (2) an advertising signal (or other video display signal) generated from a ROM in an image generator (not shown) located in the display unit 14 or generated from a signal sent over network 19 to such an image generator in display unit 14.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

Other applications include:

(1) a heads up display. This involves a transparent screen that shows video in front of or on top of a main video display.
(2) Picture in Picture. This is a secondary screen that overlaps the primary video display.
(3) Dual Monitor support. This is using the secondary monitor to show two streaming video images.
(4) Moving Picture Box. This is a video box, similar to picture in picture that can be moved or manipulated by the player, for example in touch screen.
(5) Adventure Background. This is taking video or pictures of the player and then introducing that picture into the background of the game. In other words, placing the player in the game.
(6) Big Winners Display. This is taking video or pictures of a winning player and placing that video or picture on a separate screen with a different background.
(7) Who's Who. This is taking a picture or video of a player and displaying this video or picture, along with other pictures or video of other players to casino marketing, tracking, hosts, or other casino departments.
(8) Tournament Play. This is combining video from a number of different players and showing them on one screen.
(9) Game Switching. This is playing two separate video slot games on one screen.

What is claimed is:

1. A method of creating amusement with a plurality of electronic gaming machines, each having a video display unit and each interconnected by a network to a central authority, comprising:

obtaining a first video signal in one of said gaming machines, said first video signal having
(i) game graphics information configured to generate a set of graphical symbols for play of the game on said video display unit in a game area, wherein said game comprises selecting a plurality of symbols from said set of graphical symbols to be displayed in respective ones of a plurality of display positions, wherein said plurality of display positions collectively form at least part of the game area; and
(ii) key color information identifying a non-game area on said video display unit, wherein said non-gaming area does not contain any display positions;

obtaining a second video signal selected from a plurality of second video signals, wherein said second video signal has video information configured to generate a background video display on said video display unit, wherein at least one of the plurality of second video signals is selected in response to a play-related variable reaching a pre-determined threshold, and wherein at least one of said plurality of second video signals is player-selectable and adapted for video communications with another entity; and asynchronously providing the first video signal and the selected second video signal to said video display unit based on the key color information, wherein said game area of said video display unit and said background video display are combined such that said game area overlays said background video display on said video display unit.

2. A method according to claim 1 and further including generating sound at said one gaming machine in synchronism with said background video display displayed in said non-game area.

3. A method according to claim 1, further including the step of creating key color data.

4. A method according to claim 3 wherein said step of creating key color data includes storing said key color data in said one gaming machine.

5. A method according to claim 4 wherein said step of creating key color data includes programming said key color data, including:

generating a command over said network to said one gaming machine.

6. A method according to claim 5 wherein said one gaming machine includes a communication interface connected to said network; and wherein said step of creating said key color data includes receiving said command in said communication interface; and wherein the step of storing said key color data in said one gaming machine is performed in accordance with said command.

7. A method according to claim 1, further including the step of generating a command over said network to said one gaming machine.

8. A method according to claim 7 wherein said one gaming machine includes a communication interface connected to said network; and further including the step of receiving said command in said communication interface.

9. A method according to claim 1 wherein said step of asynchronously providing the first video signal and the second video signal to said video display is performed upon command from said central authority.

10. A method according to claim 1 wherein said one gaming machine includes a communication interface connected to said network; and wherein said step of asynchronously providing the first video signal and the second video signal to said video display is performed upon command from said communication interface.

11. A method according to claim 1 wherein said one gaming machine includes a game central processing unit; and wherein said step of asynchronously providing the first video signal and the second video signal to said video display is performed upon command from said game central processing unit.

12. A method according to claim 1 wherein said step of obtaining a second video signal is performed upon command from said central authority.

13. A method according to claim 1 wherein said one gaming machine includes a communication interface connected to said network; and wherein said step of obtaining a second video signal is performed upon command from said communication interface.

14. A method according to claim 1 wherein said one gaming machine includes a game central processing unit; and wherein said step of obtaining a second video signal is performed upon command from said game central processing unit.

15. A gaming system, comprising:

a network;

a central display unit;

a video source configured to generate a plurality of background video signals, wherein at least one of said plurality of background video signals is selected in response to a play-related variable reaching a pre-determined threshold, and wherein at least one of said plurality of background video signals is player-selectable and adapted for video communications with another entity using the central display unit; and a plurality of gaming machines connected to said network, at least some of said gaming machines each having:

(i) a game processing unit;

(ii) a signal generator controllable by said game processing unit configured to generate a foreground video signal having graphical symbols for play of a game on said central display unit, wherein said game comprises selecting a plurality of symbols from a set of graphical symbols to be displayed in respective ones of a plurality of display positions, the plurality of display positions collectively forming at least part of a game area of the central display unit, wherein said foreground video signal includes key color information identifying a non-game area on said central display unit, wherein said non-game area does not contain any display positions; and (iii) a video combiner receiving a background video signal selected from said plurality of background video signals and said foreground video signal, said video combiner being arranged to asynchronously provide the selected background video signal and the foreground video signal to the central display unit based on the key color information such that said game area overlays said non-game area on said central display unit.

* * * * *

UNITED STATES PATENT AND TRADEMARK OFFICE

CERTIFICATE OF CORRECTION

PATENT NO. : 8,348,758 B2
APPLICATION NO. : 10/850852
DATED : January 8, 2013
INVENTOR(S) : Marc Cram It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1368 days.

Signed and Sealed this
Eleventh Day of November, 2014

Michelle K. Lee
*Deputy Director of the United States Patent and Trademark Office*